United States Patent
Malkin et al.

(10) Patent No.: US 7,400,905 B1
(45) Date of Patent: Jul. 15, 2008

(54) INSERTION OF SOUND SEGMENTS INTO A VOICE CHANNEL OF A COMMUNICATION DEVICE

(75) Inventors: Jeffrey S Malkin, San Francisco, CA (US); Jeffrey S Kirschner, San Francisco, CA (US)

(73) Assignee: Phonebites, Inc., San Francisco, CA (US)

( * ) Notice: Subject to any disclaimer, the term of this patent is extended or adjusted under 35 U.S.C. 154(b) by 233 days.

(21) Appl. No.: 10/690,252

(22) Filed: Oct. 20, 2003

Related U.S. Application Data

(60) Provisional application No. 60/425,807, filed on Nov. 12, 2002.

(51) Int. Cl.
*H04M 1/00* (2006.01)
(52) U.S. Cl. ............. 455/556.1; 345/168; 715/764
(58) Field of Classification Search ......... 455/556.1, 455/466; 345/168, 169
See application file for complete search history.

(56) References Cited

U.S. PATENT DOCUMENTS

| | | | | |
|---|---|---|---|---|
| 5,694,562 | A * | 12/1997 | Fisher | 715/839 |
| 6,407,325 | B2 * | 6/2002 | Yi et al. | 84/610 |
| 7,003,083 | B2 * | 2/2006 | Kovales et al. | 379/88.16 |
| 2001/0041588 | A1 * | 11/2001 | Hollstrom et al. | 455/556 |
| 2002/0082007 | A1 * | 6/2002 | Hoisko et al. | 455/426 |
| 2002/0135619 | A1 * | 9/2002 | Allport | 345/810 |
| 2003/0176206 | A1 * | 9/2003 | Taniguchi et al. | 455/567 |
| 2004/0198436 | A1 * | 10/2004 | Alden | 455/556.1 |

OTHER PUBLICATIONS

Star Wars Episode I Queen Amidala Flip Phone. Datasheet [online]. Epinions.com, 1999-2002 [retrieved on Dec. 12, 2002]. Retrieved from the Internet: <URL: www.epinions.com/kifm-Toys-All-Star_Wars_Episode_I_Queen_Amidala_Flip_Phone/display_~full_s...>, 3 pages.
Star Wars Episode I Flip Phone: Queen Amidala. Datasheet [online]. Amazon.com Editorial Review, by Chris Burns, [retrieved on Dec. 12, 2002], Retrieved from the Internet: <URL: www.newsearching.com/activity_toy/Star_Wars_Episode_I_Flip_P...>, 1 page.

* cited by examiner

*Primary Examiner*—George Eng
*Assistant Examiner*—Muthuswamy G Manoharan
(74) *Attorney, Agent, or Firm*—Fish & Richardson P.C.

(57) ABSTRACT

The disclosure is directed to a software and hardware system that includes recording and storing audio data (digital or analog) for introduction into a voice channel of a communication device. The disclosure also includes establishing a voice channel (e.g., a phone call), using one or more keystrokes on a number pad of a voice communication channel to retrieve the audio data (e.g. audio segments) that are stored in the voice communication device and mixing the audio data with the voice data in the voice channel so that the audio data is audible along with the voice data during a conversation using the voice communication device.

16 Claims, 5 Drawing Sheets

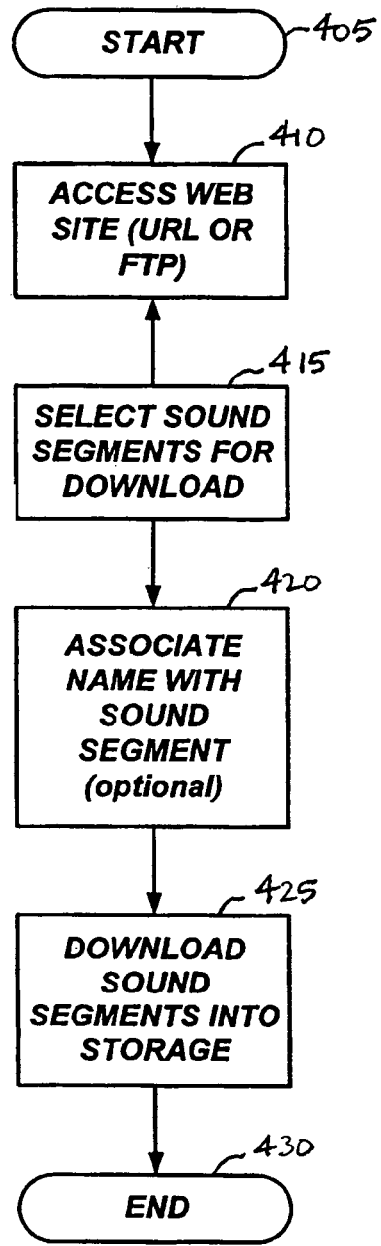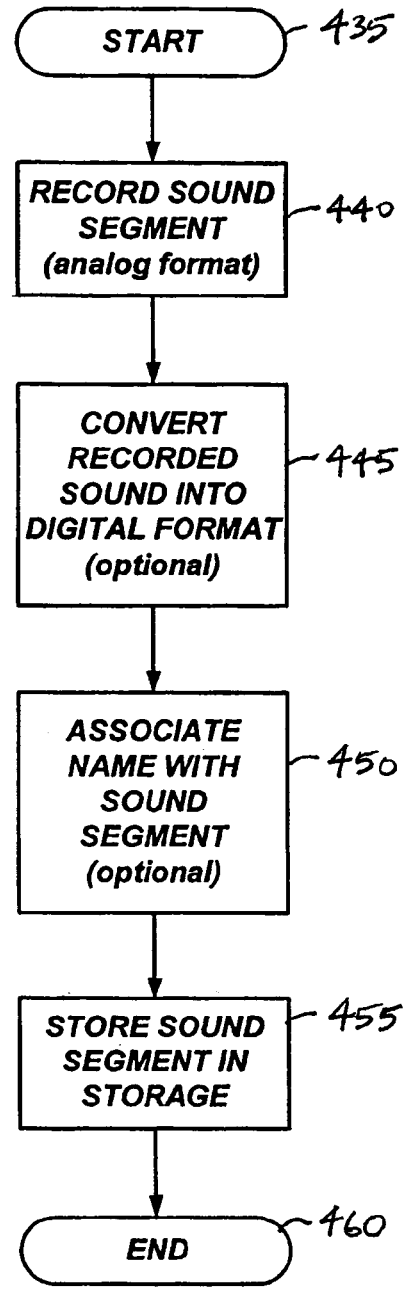
FIG. 4a
FIG. 4b

INSERTION OF SOUND SEGMENTS INTO A VOICE CHANNEL OF A COMMUNICATION DEVICE

RELATED APPLICATIONS

This application claims a priority benefit under 35 USC § 119 of U.S. Patent Application 60/425,807, filed Nov. 12, 2002, the contents of which are herein incorporated by reference.

BACKGROUND OF THE INVENTION

1. Field of Invention

The present invention relates to communication devices that establish a voice channel for the transmission of voice communications.

2. Description of the Related Arts

Mobile communication devices, e.g., wireless or cordless phones, that establish a voice channel for transmission of voice communications include, for example, conventional telephones and cellular phones. Once these mobile communication devices establish a voice channel, sound segments from within the devices themselves or other independent sources cannot be mixed into that established voice channel (other than those sounds transmitted conventionally through the built-in microphone and dial tones generated by the device keypad). Specifically, unique sound segments (or sound bytes) that are stored in data chips or on an analog medium on the device itself cannot be mixed into the voice channel because separate chips or chip sets process the voice channel from the data or analog applications. This limits functionality, flexibility, and enjoyment of use of the mobile communication device during a conversation over these devices.

Therefore, there is a need for a communication system and method that allows for mixing a sound segment (or sound byte) represented by digital data or an analog signal directly into an established voice channel between two mobile devices where the sound segment is independent of the voice information.

SUMMARY OF THE INVENTION

The present invention includes an electronic device and/or chip set for use with a wireless communication device that establishes a voice channel (audio transmission) for communications. The device may be external to the communication device or may be integrated within the communication device.

In one embodiment, the present invention includes a conductor unit that is configured for providing recorded sound segments (audio that may be digital data or an analog signal) within a voice channel by selecting recorded audio to be played, injecting the recorded audio into the voice channel, and outputting the combination of the voice from the communication devices' built-in microphone and the recorded audio so that it can be heard by both the sender and receiver. In another embodiment, the conductor unit may also be configured for recording and storing audio sound segments as discrete sound samples that can be selected, triggering selection of the discrete sound samples, and mixing and outputting the discrete sound samples into a voice or audio transmission of the voice communication device. In yet another embodiment, the conductor unit is configured for inserting sound segments (e.g., recorded audio data) into an audio transmission established by a voice communication device, the system including a selection mechanism that connects with a storage element to select a sound segment from storage, and a mixer that receives the sound segment and mixes it with available audio in a voice transmission.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 4a illustrates a flow diagram of a process of retrieving a sound segment from a network for storage in a conductor unit in accordance with one embodiment of the present invention.

FIG. 4b illustrates a flow diagram of a process for recording a sound segment from an external source for storage in a conductor unit in accordance with one embodiment of the present invention.

DETAILED DESCRIPTION OF THE INVENTION

The present invention includes a software and/or hardware system that includes recording and storing audio data (digital or analog) for introduction into a voice channel (e.g., a phone call) established between two or more communication devices (e.g., voice transmission communication devices). In one embodiment, the communication device is a mobile communication device, e.g., a cellular phone, a cordless phone, or a wireless communicator. The audio data may be referred to as sound segments and can be pre-stored in a storage system for later retrieval. Alternatively, the audio data may be recorded and stored from an external source, for example, downloaded through a network (e.g., the Internet) or media device (e.g., an MP3 player, a tape device, a CD player, or DVD player). In yet another embodiment, the audio data (or sound segment) is simply received from the media device and passed through the system and mixed with the voice channel. Further, it is noted that the audio data may be in any audio file format, including analog, audio interchange file format, audio video interleave, WAVE, broadcast WAVE, MPEG-2, AU, AES-31, MP3, MP4, PCM, Dolby Digital, DTS, Real Audio, Sony Dynamic Digital Sound, and the like.

Figure 1A:
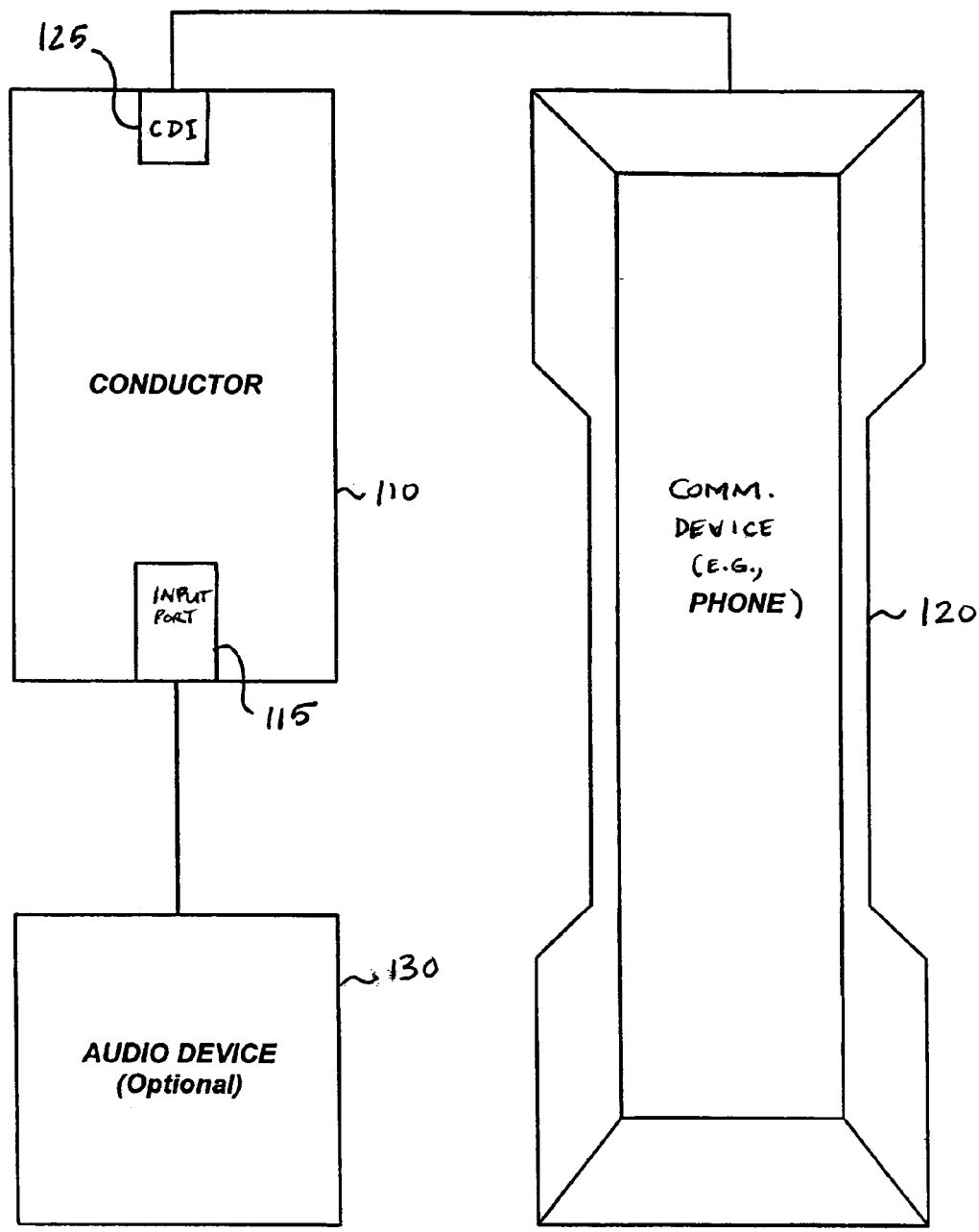
FIG. 1a illustrates a conductor unit that is external to a communication device in accordance with one embodiment of the present invention.

Looking first at FIG. 1a, it illustrates a voice channel sound insertion system 100 in accordance with one embodiment of the present invention. The voice channel sound insertion system 100 includes a conductor unit 110, a communication device (e.g., a phone) 120, and an audio device 130, which is optional. The conductor unit 110 includes an input port 115 and a communications device interface ("CDI") 125.

The conductor unit 110 provides a source of sound segments (e.g., analog or digital audio data) that may be introduced into a voice channel that carries voice data (or voice stream). It is noted that in FIG. 1a, the conductor unit 110 is shown as a stand-alone device that couples with a communication device 120 through the CDI 125. The conductor unit 110 may also include the input port 115 (e.g., an audio (or stereo) jack, a Universal Serial Bus ("USB") port, or a communication transceiver such as a wireless LAN or Bluetooth transceiver) that is configured to receive audio from the audio device 130 (e.g., an MP3 player, a tape device, a network computer, a personal computer, a handheld computer, a CD player, or a DVD player). Audio received from the audio device 130 can be either passed through the conductor unit 110 for immediate mixing into the voice channel or stored as a sound segment in the conductor unit 110 for later recall and mixing into the voice channel.

The communication device 120 is a conventional device that establishes (or is used for) a voice channel, e.g., a telephone, cellular phone, wireless communicator, or Internet Protocol phone. The CDI 125 is a communication interface for coupling the conductor unit 110 with the communication device 120.

Figure 1B:
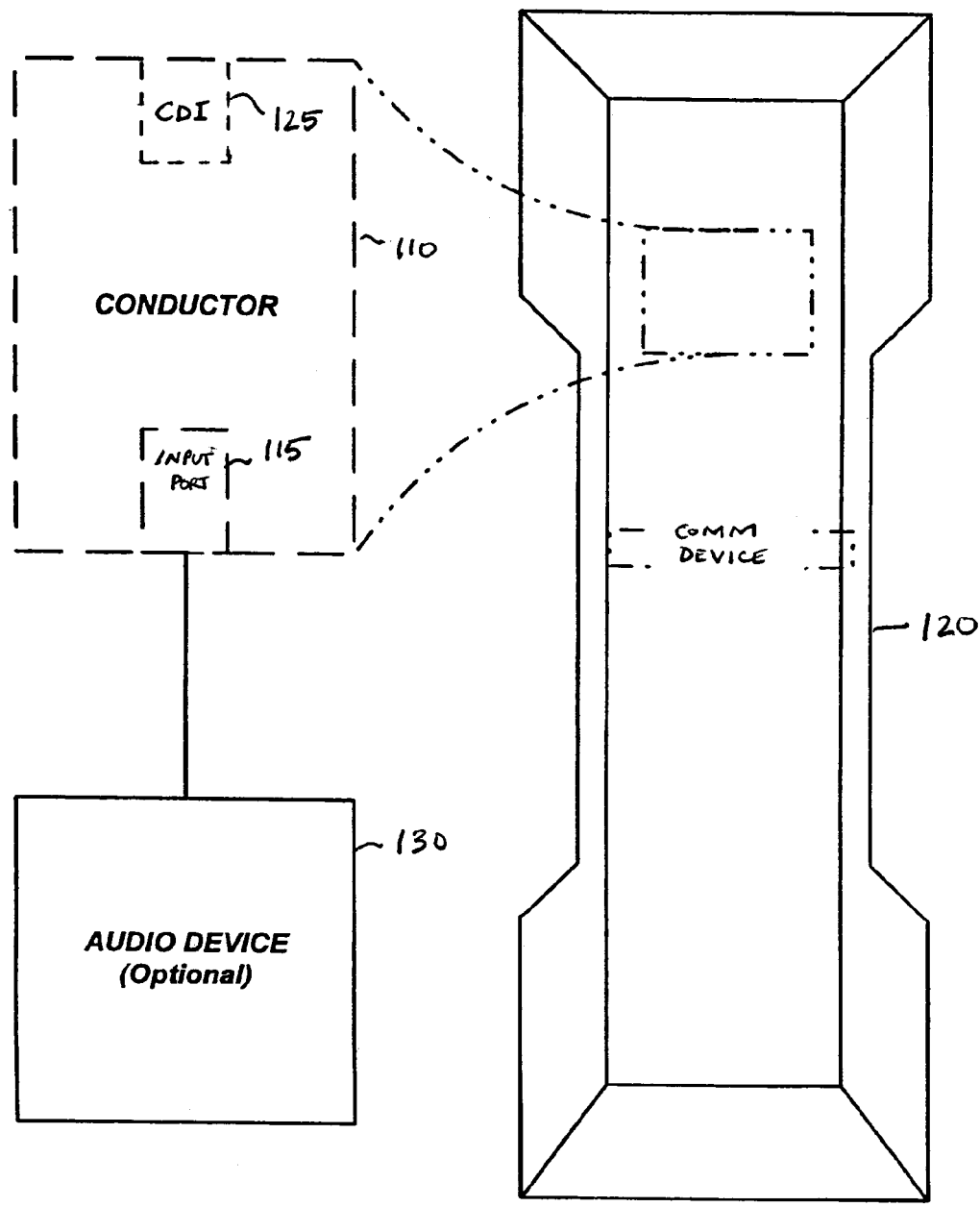
FIG. 1b illustrates an exploded view of a conductor unit that is internal to a communication device in accordance with one embodiment of the present invention.

FIG. 1b illustrates a second embodiment of a voice channel sound insertion system 101 having an exploded view of the conductor unit 110 that is internal to the communication device 120 in accordance with one embodiment of the present invention. In this embodiment, the conductor unit 110 may be configured to reside within a communication device 120 that establishes a voice channel. For example, the conductor unit 110 may be a self-contained chip or chip set that is configured to connect with the other communication chips or chip sets in the communication device.

Alternatively, the functionality of the conductor unit 110 may be integrated into a preexisting chip or chip set of the communication device 120. Moreover, if a voice and data chip are closely integrated or merge with regard to functionality and design, the principles of the present invention allow for another embodiment in which the functionality of the conductor unit may be comprised of a software application or firmware that functions in conjunction with that chip, and if necessary other components such as a microcontroller or microprocessor, to insert audio data into a voice channel.

Figure 2:
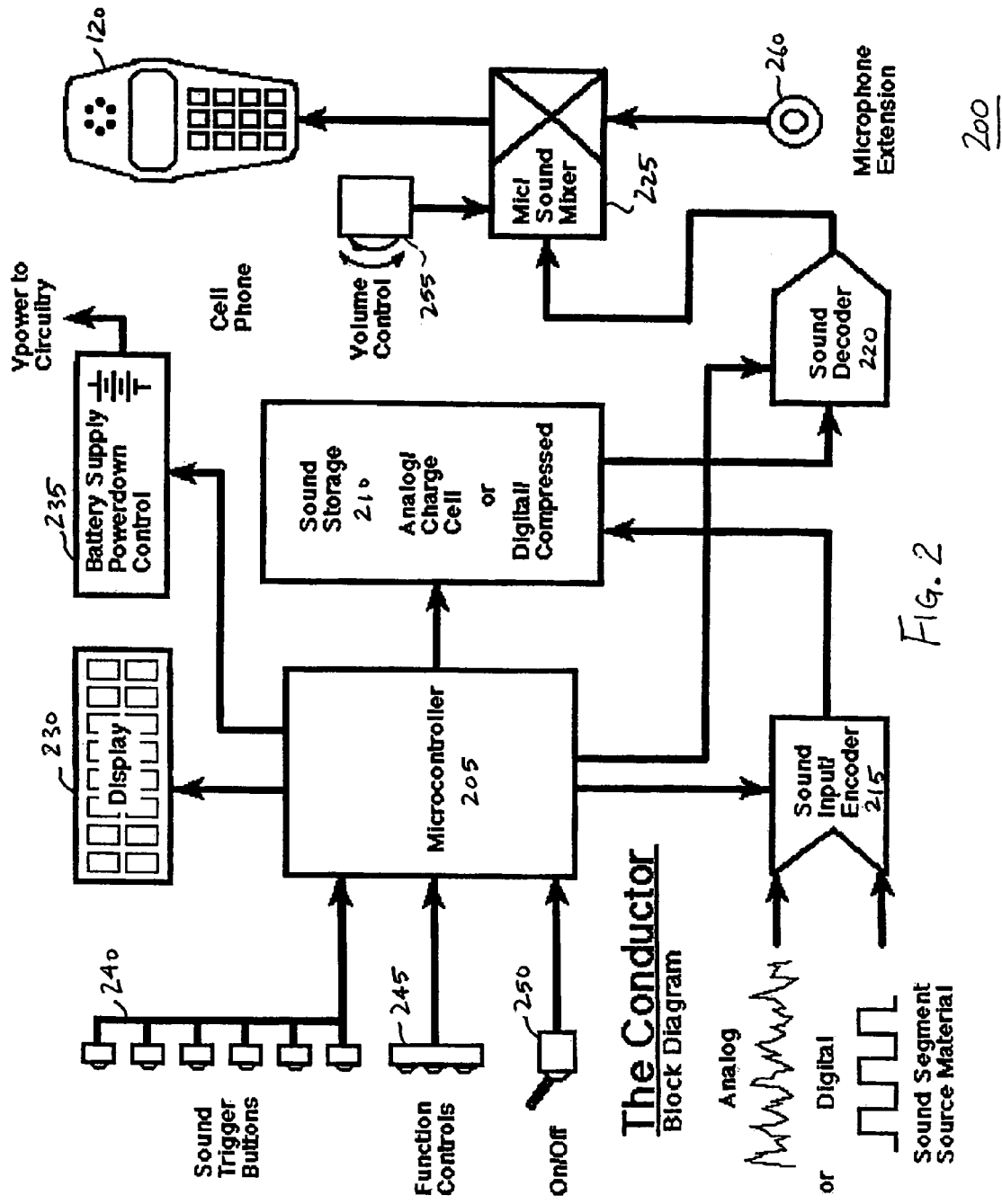
FIG. 2 illustrates a system configuration of a conductor unit in accordance with one embodiment of the present invention.

FIG. 2 illustrates a system configuration 200 of the conductor unit 110 in accordance with one embodiment of the present invention. The conductor unit 110 includes a microcontroller 205, a storage 210 (e.g., an EEPROM, a flash memory, an optical or magnetic disk drive, or a battery backed SRAM or DRAM), a sound input/encoder 215, a sound decoder 220, a mixer 225, a display 230, a power supply 235 (e.g., battery), one or more sound trigger mechanisms 240, function controls 245, and an ON/OFF switch 250. The function controls 245 include particular functions that are specific to the device, such as recording new sound segments.

Generally, the microcontroller 205 couples with the storage 210, the display 230, the power supply 235, the sound input/encoder 215, the sound decoder 220, the sound trigger mechanisms 240, the function controls 245, and the ON/OFF switch 250. The sound decoder 220 couples with the sound input/encoder 215, the sound decoder 220, and the mixer 225. The mixer 225 also couples with a volume control 255, the communication device 120 (e.g., a cellular phone is illustrated in FIG. 2) and an optional microphone extension 260.

Figure 3:
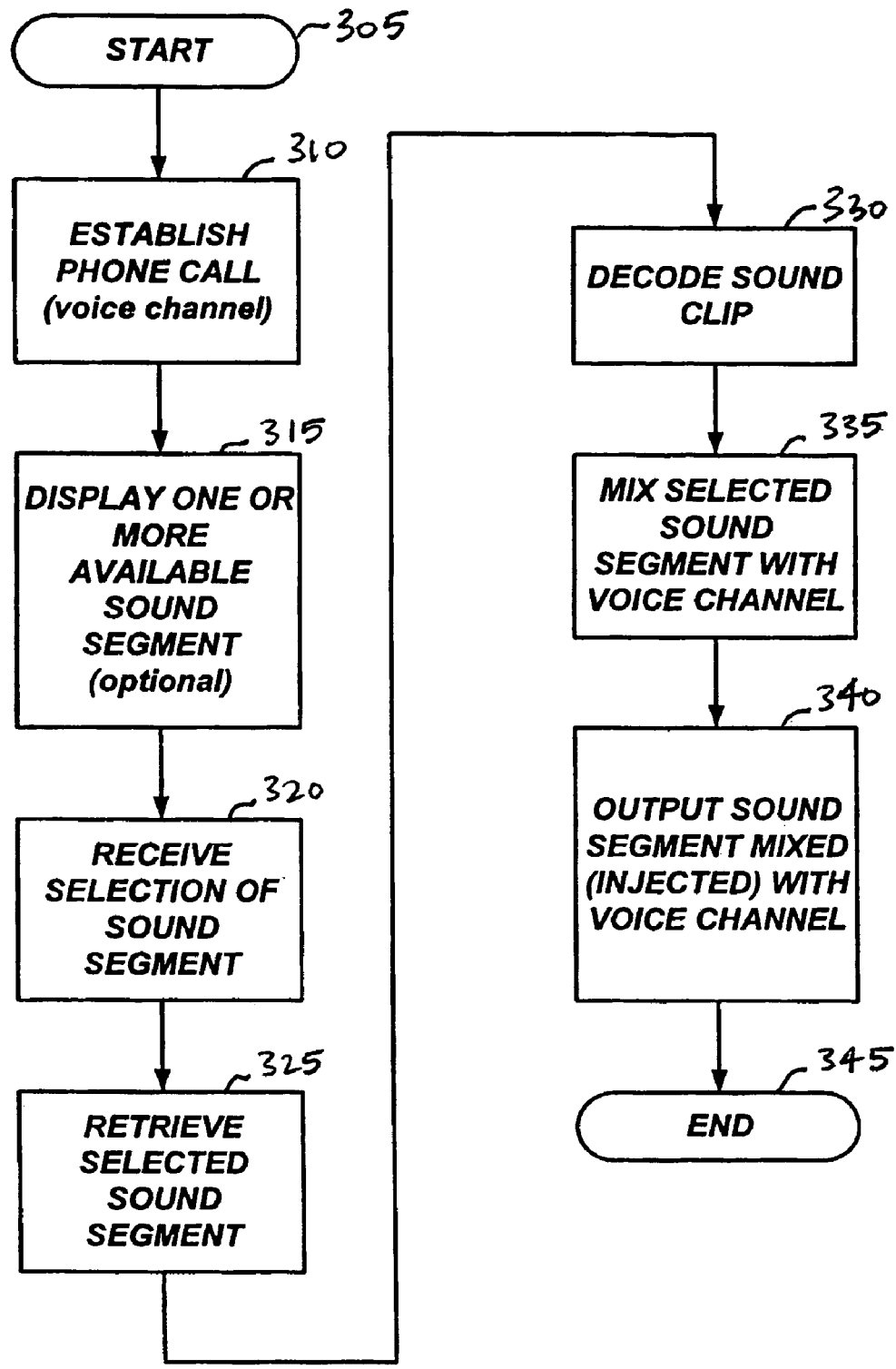
FIG. 3 illustrates a flow diagram of a process for introducing and outputting a sound segment within a voice channel in accordance with one embodiment of the present invention.

The microcontroller 205 is a conventional microcontroller that executes instructions and provides functionality for the conductor. For example, the microcontroller 205 executes instructions for the processes illustrated in FIGS. 3, 4a, and 4b. For example, FIG. 3 illustrates a flow diagram of a process for introducing and outputting a sound segment within a voice channel in accordance with one embodiment of the present invention. In addition, FIG. 4a illustrates a flow diagram of a process of retrieving a sound segment from a network for storage in a conductor unit in accordance with one embodiment of the present invention. FIG. 4b illustrates a flow diagram of a process for recording a sound segment from an external source for storage in a conductor unit in accordance with one embodiment of the present invention. The processes in these Figures will be further described below.

The microcontroller 205 also provides functionality for other operations. For example, the microcontroller 205 functions with the sound input/encoder 215 to operate on an analog or digital data input to receive the data (e.g., audio, text, graphic, etc.) and prepare it for storage in the storage 210 or contemporaneously mix it with a voice channel through the mixer 225 (e.g., via the sound decoder 220). As another example, the microcontroller 205 functions with the sound decoder 220 to retrieve stored data from the storage 210 and process the stored data for mixing with the voice channel through the mixer 225.

The encoder 215 serves to convert the incoming audio information from its native format into the proper format to be stored within the conductor unit 110, or to be mixed with the voice program. For example, the encoder 215 can convert analog audio into the PCM format, or WAVE format to PCM, etc. The decoder 220 functions to provide a converse of the encoder 215—it converts the stored information from the format used by the storage 210 into the proper format to be mixed into the voice channel. For example, the decoder 220 would convert PCM data to MP3, PCM to analog, MP3 to analog, etc.

The microcontroller 205 may also be configured to function with the storage 210 to provide data and database storage functions. For example, storing the input data may also include setting up and creating categories in some other catalog or database format that provides organization for the data. This allows for easy retrieval and organization, for example, through menus and files visible on the display 230 and controlled through the function controls 245 and/or the trigger mechanisms 240, all of which function with the microcontroller 205. It is noted that the data in the storage 210 may be stored in analog or digital format and may be compressed to allow for greater storage capacity. Further, the storage 210 may also be used for storing data such as pictures, graphics, and the like.

The microcontroller 205 is also configured to function in conjunction with the trigger mechanisms 240 and the function controls 245. The trigger mechanisms 240 can be switches that allow for selection of sound segments from the storage. The selection options may be viewable to a user through the display. The trigger mechanisms 240 can be dedicated buttons, switches, or dials. Alternatively, the trigger mechanisms 240 can also be configured to work with established triggers, for example, a keypad or number pad on a communication device 120.

In yet another embodiment, the trigger mechanism 240 can be a touch screen that may integrated with the display 230 or on a display of the communication device 120. In addition, the trigger mechanism 240 may also be a graffiti or handwriting recognition area integrated in with the display area 230 or with the communication device 120, e.g., a graffiti section on a on a personal information device (e.g., a PDA) having voice channel capability. The microcontroller 205 may also provide functionality to control power levels in the conductor, e.g., shutting it on or off if the device is not in use for some predetermined time. The function controls 245 may be configured to provide user functionality such as "Repeat Selection", "Set Selection" (e.g., "sets" of files to play), auto power on/off, and the like.

The mixer 225 allows for injection of a selected sound segment into a voice channel. Specifically, the mixer 225 adds two or more audio channels together and merges them into a signal stream. For example, once a voice channel is established, a user may inject a sound segment to be incorporated into that voice channel. The mixed sound segment and voice data gets output through a speaker in a communication device receiving the sound from the sending communication device 120. Note that in the transmitting phone, the mixed signal is transmitted into the voice channel. In one embodiment, the mixer functions as an analog device. In this embodiment, audio out of the storage 210 via the decoder 220 would be analog, and would add with the user's voice, which is also analog, in the mixer 225. In this embodiment, mixing may be done through, for example, "forced summing" or "summing amplifier."

In the forced summing process, two or more analog signals are simply isolated from each other with resistors and tied together. This method creates a single stream output, but may add some noise to the circuit. In addition, in this embodiment signal sources often are of similar electrical impedance so as not to interfere with each other. In the summing amplifier process, two or more analog signals are resistively summed at the high-impedance inverting input of an audio amplifier. The high-impedance input provides near total isolation between the signal sources. This method allows the noiseless summing of various types of signals.

In an alternative embodiment, if the audio data is signals from a digital domain, mixing of the data is through conventional digital data mixing techniques using an appropriately configured microprocessor or digital signal processor ("DSP"). In an example of this embodiment, a device mixing digital data would take two or more audio data streams and perform the necessary mathematical computations to create a new data stream containing both sets of information.

FIG. 3 illustrates a flow diagram of a process for introducing and outputting a sound segment within a voice channel in accordance with one embodiment of the present invention. For purposes of an illustrative example, the process will be described with regard to a phone-type communication device.

Once the process starts 305, a user (e.g., a first party) may initially establish 310 a phone call using the communication device 120 between that user and a person receiving a call (e.g., a second party). In this example, this may be referred to as establishing a voice channel. During a course of a conversation between the user and the person receiving the call, a user may decide to inject particular sound segments into the voice channel. To do this, the user may use the display screen 230 to display 315 and navigate through menus and/or lists of available sound segments in the storage 210. Alternatively, the sounds may be preprogrammed to be associated with specific trigger mechanisms 240 or a combination of two or more trigger mechanisms 240 so that that use of the display 230 may not be necessary.

Once the user determines which sound segment they want, this selection is received 320 by the microprocessor 205 and it is retrieved from the storage 210. The sound segment is forwarded to the sound decoder 220, where it is decoded 330 and sent to the mixer 225. The sound segment is then injected 335, e.g., mixed, into the same voice channel as the voice communication. The mixed sound segment and voice communication is then output 340 through a microphone in the communication device 120 for the receiving user to hear through a speaker on that user's communication device. The process may then end 345. Hence, if the selected sound segment was, for example, the first three chords of the song "Oh! Suzanna," these chords would be injected into the voice channel and heard with the voice communication by both the person receiving the call and the person sending the transmission.

FIGS. 4*a* and 4*b* illustrate examples of additional processes that allow for populating the storage 210 of the conductor unit 110 with additional sound segments. FIG. 4*a* illustrates a flow diagram of a process of retrieving a sound segment from a network for storage in a conductor unit in accordance with one embodiment of the present invention. The network may be an Internet site to which the user would access and gain access to additional pre-recorded sound segments for downloading into the storage 210. These sound segments may be in any audio data format, for example, such as those listed above.

Generally, the process starts 405 with the user accessing 410 a web site (e.g., HTTP, HTTPS, FTP or other connection). The user selects 415 a sound segment for download to the conductor unit 110. The user may elect to associate 420 a name with the sound segment or associate one or more of the trigger mechanisms 240 with the sound segment. The sound segment is then downloaded (or transferred) 425 into storage before the process ends 430.

It is noted that in one embodiment the user may connect to the web site through, for example, a web enabled communication device 120 that couples with the conductor unit 110. In this embodiment sound segments may be made immediately available to the conductor unit 110. Alternatively, the user may connect to the web site through a personal computer or the like, download the sound segment, and forward it to the conductor unit 110 at a later time, e.g., download through a USB port connection between personal computer and the CDI on the conductor unit 110.

FIG. 4*b* illustrates a flow diagram of a process for recording a sound segment from an external source for storage in a conductor unit in accordance with one embodiment of the present invention. The recorded sound segment can be through a recording mechanism, e.g., a microphone, that is built into the conductor and that is coupled with the microprocessor, function controls, and storage so that the sound can be recorded and stored directly by the conductor.

Generally, the process starts 435 with a user recording 440 a sound segment. Optionally, this recorded sound segment may be converted 445 into a digital format. In addition, the user may elect to associate 450 a name with the recorded sound segment or associate one or more of the trigger mechanisms 240 with the recorded sound segment. The sound segment is then downloaded (or transferred) 455 into storage before the process ends 460.

Alternatively, external media sources such as MP3 players, CD players, tape players, or the like, may be a source of sound segments and may connect with the conductor unit 110 through the input port 115, e.g., an audio (or stereo) jack. In yet another embodiment, the sound segments may be from a computer device, e.g., a stored audio data on a computer that connects to the conductor through a USB port or a communication transceiver. The sound from these external media sources can then be captured and stored in the storage. It is also noted that the sound segments from the external sources may also be passed through the conductor and mixed with the voice channel before being output through the speaker. In such embodiments, the sound segments would not need to be stored in the conductor.

In general, the present invention beneficially provides a system and a method for selecting and injecting audio data into a voice channel of a communication device so that both the person on a receiving end of voice data communication, and the person on the transmitting end, hear not only the voice communication through the voice channel, but also the selected audio data. Thus, a system and method in accordance with the present invention increases flexibility and use of the communication device and also enhances enjoyment of such a device.

Upon reading this disclosure, those of skill in the art will appreciate still additional alternative structural and functional designs for a technique for integrating sound segment directly within a voice channel in accordance with the disclosed principles of the present invention. In addition, the principles described herein may also apply to inserting motion or still frame video having associated sound segments into a voice channel. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A device for inserting sound segments into a voice channel carrying a voice stream of a voice transmission communication device, comprising:

a client controller structured and arranged:
to store two or more catalogs, each catalog including two or more different sound segments,
to receive instructions that a particular catalog has been selected, and
to load the selected catalog such that two or more sound trigger buttons on a handset become programmed to each correspond to a specific sound segment within the selected catalog, the two or more sound trigger buttons are adapted to be activated in response to a user input after a voice channel is established, each sound trigger button being configured to enable selection of a specific corresponding sound segment within the catalog loaded by the client controller for insertion into the voice channel responsive to sound trigger button activation during an ongoing communication over the voice channel;

a display configured to present a menu associated with two or more different sound segments within the selected catalog loaded by the client controller;

a communications interface configured to establish the voice channel;

sound trigger buttons configured to enable selection, in response to user input reflecting activation of the sound trigger button during the ongoing communication over the established voice channel, of the sound segment corresponding to the selected sound trigger button from among the two or more different sound segments within the catalog loaded by the client controller, the sound segment to be carried within the voice channel, the voice channel carrying voice data; and a mixer configured to couple with the audio channel, to receive a selected sound segment within the catalog loaded by the client controller in response activation of the sound trigger button and to inject the selected sound segment into the voice channel, the voice channel contemporaneously carrying the selected sound segment and voice stream as a single output stream.

2. The device of claim 1, further comprising a sound encoder configured to receive the selected catalog from a source external to the device.

3. The device of claim 2, wherein the sound segments within the selected catalog are in a file format comprising one from a group consisting of an MP3 file format, a WAVE file format, and an audio video interleave file format.

4. The device of claim 1, further comprising a communications device interface for coupling with a communication device.

5. The device of claim 1, wherein the two or more sound trigger buttons adapted to be activated in response to a user input after the voice channel is established include two or more sound trigger buttons adapted to be activated in response to a user input during a time period after a call initiating party and a call receiving party have begun conversation.

6. A method for inserting audio data within an established voice channel of a voice transmission communication device, the method comprising:

accessing a client controller structured and arranged:
to store two or more catalogs, each catalog including two or more different sound segments,
to receive instructions that a particular catalog has been selected, and
to load the selected catalog such that two or more sound trigger buttons on a handset become programmed to each correspond to a specific sound segment within the selected catalog, the two or more sound trigger buttons are adapted to be activated in response to a user input after a voice channel is established, each sound trigger button being configured to enable selection of a specific corresponding sound segment within the catalog loaded by the client controller for insertion into the established voice channel responsive to sound trigger button activation during an ongoing communication over the established voice channel;

presenting a menu associated with two or more different sound segments within the catalog loaded by the client controller;

receiving user input reflecting activation of one of the sound trigger buttons during an ongoing communication over the established voice channel;

selecting, in response to the user input reflecting activation of the sound trigger button during the ongoing communication over the established voice channel, the sound segment corresponding to the selected sound trigger button from among the two or more different sound segments within the catalog loaded by the client controller, the sound segment to be carried within the voice channel, the voice channel carrying voice data;

injecting the sound segment into the established voice channel through mixing of the sound segment with the voice data to generate a mixed sound segment and voice data stream; and outputting the mixed sound segment and voice data stream as a single output stream into the established voice channel.

7. The method of claim 6, further comprising receiving the selected catalog from an external audio source.

8. The method of claim 6, further comprising saving the sound segments within the selected catalog in an audio file format.

9. The method of claim 8, wherein the audio file format comprises one from a group consisting of an MP3 file format, a WAVE file format, and an audio video interleave file format.

10. The method of claim 6, wherein receiving the user input reflecting activation of one of the sound trigger buttons includes receiving the user input during a time period after a call initiating party and a call receiving party have begun conversation.

11. The method of claim 6, wherein selecting, in response to the user input reflecting activation of the sound trigger button during the ongoing communication over the established voice channel includes selecting, in response to the user input reflecting activation of the sound trigger button during the ongoing communication after the voice channel is established.

12. A system for inserting audio data within an established voice channel, comprising:

means for accessing a client controller structured and arranged:

to store two or more catalogs of sound segments, each catalog including two or more different sound segments, to receive instructions that a particular catalog has been selected, and to load the selected catalog such that two or more sound trigger buttons on a handset become programmed to each correspond to a specific sound segment within the selected catalog, the two or more sound trigger buttons are adapted to be activated in response to a user input after a voice channel is established, each sound trigger button being configured to enable selection of a specific corresponding sound segment within the catalog loaded by the client controller for insertion into the established voice channel responsive to sound trigger button activation during an ongoing communication over the established voice channel;

means for presenting a menu associated with two or more different sound segments within the catalog loaded by the client controller;

a means for receiving user input reflecting activation of one of the sound trigger buttons during an ongoing communication over the established voice channel;

a means for selecting, in response to the user input reflecting activation of the sound trigger button during the ongoing communication over the established voice channel, the sound segment corresponding to the selected sound trigger button from among the two or more different sound segments within the catalog loaded by the client controller, the sound segment to be carried within the voice channel, the voice channel carrying voice data;

a means for injecting the sound segment into the established voice channel through mixing of the sound segment with the voice data to generate a mixed sound segment and voice data stream; and a means for outputting the mixed audio data and voice data stream into the established voice channel.

13. The system of claim 12, further comprising a means for receiving the selected catalog from an external audio source.

14. The system of claim 12, further comprising a means for saving the sound segments within the selected catalog in an audio file format.

15. The system of claim 14, wherein the audio file format comprises one from a group consisting of an MP3 file format, a WAVE file format, and an audio video interleave file format.

16. The system of claim 12, wherein the means for selecting, in response to activating the selected sound trigger button with a user input, the sound segment from among the two or more different sound segments after the voice channel is established includes means for selecting, in response to activating the selected sound trigger button with a user input, the sound segment from among the two or more different sound segments during a time period after the call initiating party and the call receiving party have begun conversation.

\* \* \* \* \*